(12) United States Patent
Kawashima et al.

(10) Patent No.: US 6,680,448 B2
(45) Date of Patent: Jan. 20, 2004

(54) TOUCH PANEL FOR DISPLAY DEVICE

(75) Inventors: Satoshi Kawashima, Iwata-gun (JP); Toshiaki Asakawa, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 30 days.

(21) Appl. No.: 10/046,408

(22) Filed: Jan. 16, 2002

(65) Prior Publication Data

US 2002/0092746 A1 Jul. 18, 2002

(30) Foreign Application Priority Data

Jan. 18, 2001 (JP) ........................................ 2001-010201

(51) Int. Cl.[7] .............................. H01H 9/16; G02F 1/335
(52) U.S. Cl. ....................... 200/310; 200/512; 345/173
(58) Field of Search ............................... 178/18, 18.03, 178/20.01; 200/512, 514, 308, 310, 313, 314, 317; 345/156, 173, 174

(56) References Cited

U.S. PATENT DOCUMENTS

| | | | | |
|---|---|---|---|---|
| 4,532,395 A | * | 7/1985 | Zukowski | 200/314 |
| 4,700,025 A | * | 10/1987 | Hatayama et al. | 200/5 A |
| 4,965,421 A | * | 10/1990 | Epperson | 200/514 |
| 6,362,815 B1 | * | 3/2002 | Leenhouts | 345/173 |
| 6,380,497 B1 | * | 4/2002 | Hashimoto et al. | 200/5 A |
| 6,456,279 B1 | * | 9/2002 | Kubo et al. | 345/173 |
| 6,529,188 B1 | * | 3/2003 | Suzuki | 345/173 |

FOREIGN PATENT DOCUMENTS

WO    WO 99/63394    * 12/1999

* cited by examiner

*Primary Examiner*—Michael Friedhofer
(74) *Attorney, Agent, or Firm*—Nath & Associates PLLC

(57) ABSTRACT

There is provided a touch panel for a display device for reducing the whole thickness thereof when the touch panel is attached to the display device, increasing the accuracy of the positional information and improving the display quality and the durability thereof. One resistive layer of a pair of resistive layers disposed opposite to each other across a plurality of insulating dot spacers is laid on a translucent flat plate, and a light conductive plate of a front light unit is integrated with an outer surface side of the translucent flat plate. The translucent flat plate is formed of a PET film in place of a glass plate.

4 Claims, 2 Drawing Sheets

TOUCH PANEL FOR DISPLAY DEVICE

BACKGROUND OF THE INVENTION

1. Field of the Invention

The present invention relates to a touch panel for a display device which is disposed close to a display surface of a display device such as a liquid crystal display device and generates a specified signal corresponding to a position touched when an operator touches a desired position on a panel surface with a pen or a finger based on information displayed on the display surface.

2. Description of the Related Art

Since the panel surface of this type of a touch panel can be used for both display and input of information, the utilization factor of the panel surface is increased, and the touch panel is in demand for compact information processors and communication equipment, in particular, mobile communications terminals.

FIG. 2 is a sectional view of a conventional touch panel (disclosed in FIG. 2 in Japanese Unexamined Patent Application Publication No. 2000-187197).

As shown in FIG. 2, a touch panel 10 basically comprises a pair of resistive layers (fist and second resistive layers) 12 and 13 disposed opposite to each other across a plurality of insulating dot spacers 11, and a flat transparent plate protecting the second resistive layer, for example, a transparent glass plate 16. The second resistive layer 13 is laid on the glass plate 16 while the touch panel 10 is disposed close to the display device 30 such that the glass plate 16 faces the display surface of the display device 30.

In this construction, when an outer surface of the first resistive layer 12 is touched to be pressed, a touched portion of the first resistive layer 12 is brought into contact with a portion opposite thereto of the second resistive layer 13, and a signal corresponding to the contact position (touched position) is generated.

In a practical construction, a transparent layer, for example, a Polyethylene Terephthalate film (hereinafter, referred to as "PET" 15, is laminated on an outer surface of the first resistive layer 12 for protecting thereof, so the touching operation is implemented on this PET film 15.

The first and second resistive layers 12 and 13 are combined at their peripheries by means of a sealing member 14 thereby making them dustproof and waterproof.

A light unit is added to the above-described display device 30 to illuminate the display surface brightly for making it easy to observe. A front light unit 20 to shine light on a front face (display surface) of the display device 30 is often used as the light unit in recent years.

FIG. 2 shows the touch panel 10 attached to the display device 30 having the front light unit 20 above described.

As shown in FIG. 2, the front light unit 20 has a light conductive plate 22 disposed facing the display surface of the display device 30, and guides light emitted from a light source 21 located along the light source 21 toward the display surface of the display device 30 through the light conductive plate 22. The light made incident on the display surface enters the display device 30, is reflected at a bottom surface thereof, travels through the light conductive plate 22 and the touch panel 10, and exits out (refer to an arrow indicated by a broken line in the figure), whereby an image on the display surface is visualized.

An array of prisms whose respective ridges are parallel to each other are formed on a surface opposite to a surface facing the display surface of the display device 30 so that, as described above, the light conductive plate 22 can guide light coming therein from its end toward the display surface of the display device 30 disposed therebelow.

However, in the conventional technology shown in FIG. 2, since the touch panel 10 and the front light unit 20 are constituted independent of each other, the touch panel 10 is easily subjected to the vibration and shock. And, because the touch panel 10 is required for strength against the vibration and shock when mounted on the device body, the thickness of the glass plate 16 needs to be increased so as to avoid damages on the glass plate 16. However, there is a problem that the whole thickness (the depth) D of the display device 30 is increased when attached to the touch panel 10. There is another problem that since the light conductive plate 22 is brought into a direct contact with the glass plate 16, the light conductive plate 22 can be damaged or broken by the glass plate 16 when a vibration or shock is applied to the touch panel 10.

Thus, a touch panel for a display device (the touch panel shown in FIG. 1 in the above-described Japanese Unexamined Patent Application Publication) was disclosed, where, as shown in FIG. 3, a second resistive layer 13 of a touch panel 10 is in a close contact with a surface of a light conductive plate 22, on which an array of prisms are formed.

In this touch panel, a member (the glass plate 16 in FIG. 2) interposed between the light conductive plate 22 and the second resistive layer 13 of the touch panel 10 is eliminated, and the touch panel 10 is integrated with a front light unit 20, and thus, the whole thickness D can be reduced when the touch panel and the front light unit are attached to a display device 30. Further, the glass plate 16 in FIG. 2 is not present, and thereby the problem that the light conductive plate 22 is damaged or broken by the glass plate when a vibration or shock is applied to the touch panel 10 can be solved.

However, there is a problem described below in the conventional technology shown in FIG. 3.

Since the second resistive layer 13 is in a close contact with the surface of the light conductive plate 22, on which the array of prisms are formed, as described above, a surface facing a first resistive layer 12 is also uneven corresponding to the surface of the array of prisms, and insulating dot spacers 11 are interposed between the uneven surface of the second resistive layer 13 and a flat surface of the first resistive layer 12.

Thus, the linearity of the resistance value at each position on a touch panel operation surface (surface of the PET film 15) is difficult to ensure, and errors occur easily in information obtained on the position.

In addition, there is a durability problem that projecting portions of the prisms formed on the one surface of the light conductive plate 22 and projecting portions of the second resistive layer 13 to cover the light conductive plate are easily damaged while the touch panel 10 is used.

SUMMARY OF THE INVENTION

Accordingly, it is an object of the present invention to provide a touch panel for a display device, which combines advantages of the conventional technologies shown in FIGS. 2 and 3 that the whole thickness is not increased excessively when the touch panel is attached to the display device, the light conductive plate is not damaged or broken when a vibration or shock is applied to the touch panel, no errors occur in information obtained on the position, the touch panel operation surface does not become wavy, the display quality is not degraded, and that the durability is excellent.

According to the present invention, in a touch panel for a display device which is structured such that one resistive layer of a pair of resistive layers disposed facing each other across a plurality of insulating dot spacers is laid on a translucent flat plate, is disposed close to a display device such that the translucent flat plate is directed toward a display surface of the display device and that a front light unit comprising a light source and a light conductive plate to guide light emitted from the light source toward the display surface of the display device is interposed therebetween, and in which a signal is generated by touching an outer surface of the other resistive layer corresponding to a position touched, wherein the translucent flat plate is formed of a polyethylene terephthalate film, and the light conductive plate is integrally combined with an outer surface of the polyethylene terephthalate film.

DESCRIPTION OF THE PREFERRED EMBODIMENTS

Preferred embodiments in accordance with the present invention will be described below.

Figure 1:
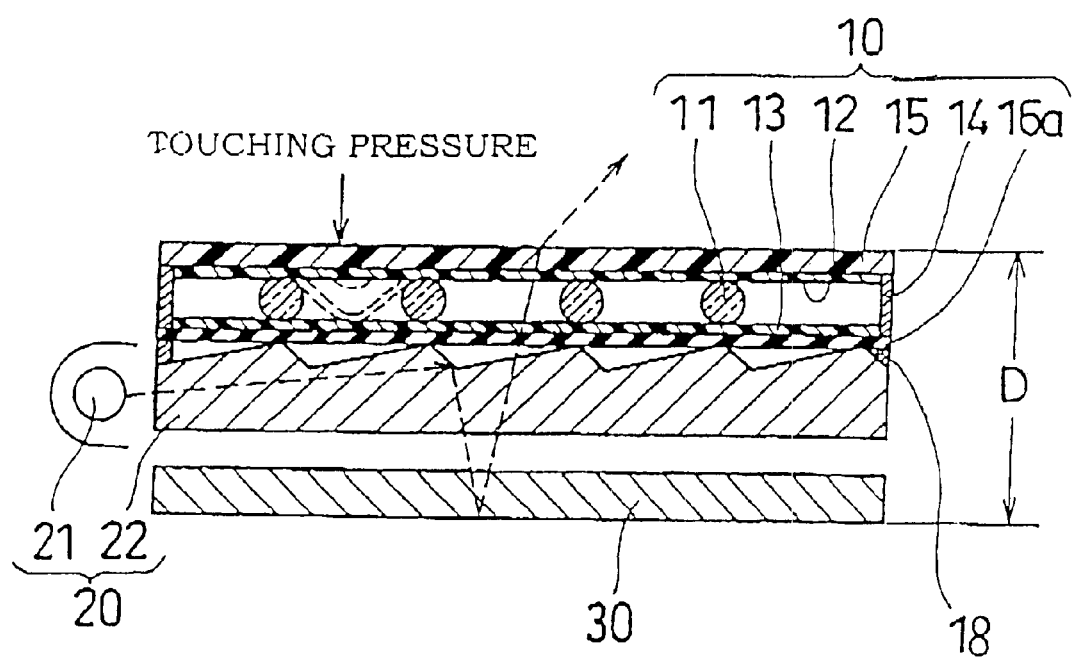
FIG. 1 is a sectional view of a touch panel for a display device according to an embodiment of the present invention.

FIG. 1 is a sectional view of a first embodiment of a touch panel for a display device in accordance with the present invention.

As shown in the figure, a touch panel 10 according to the first embodiment basically comprises a pair of resistive layers disposed opposite to each other across a plurality of dot spacers 11, for example, ITO films (first and second ITO films) 12 and 13, and a translucent flat plate for protecting the ITO films, i.e., a PET film 16a in the present invention. The second ITO film 13 is laminated on the PET film 16a, and the touch panel 10 is disposed close to a display device 30 such that this PET film 16a faces a display device, i.e., the display surface of the liquid crystal display device 30.

In such a construction, when an outer surface of the first ITO film 12 is touched to be pressed, the touched portion of the first ITO film 12 is brought into contact with a portion of the second ITO film 13 opposite thereto, and a signal corresponding to the contact position (the touched position) is generated.

In a practical construction, a translucent layer, i.e., a PET film 15 in this embodiment is laminated on the outer surface of the first ITO film 12 for protection thereof, and thus, the touching operation is implemented on this PET film 15.

The first and second ITO films 12 and 13 are combined at their peripheries by means of a sealing member 14 to make the ITO films dustproof and waterproof.

In the present invention, in a front light unit 20 having a light source 21 and a light conductive plate 22 to guide light from this light source 21 toward a display surface of the display device 30, the light conductive plate 22 is structured integrally with the outer surface side of the PET film 16a.

The touch panel 10 is integrated with the light conductive plate 22 (the front light unit 20) using a pressure sensitive adhesive double coated tape or a jointing member formed of a resin to couple the PET film 16a with the light conductive plate 22 on their peripheral portions. This jointing member 18 provides dustproof and waterproof functions for the PET film 16a and the light conductive plate 22.

An array of prisms whose ridges are parallel to each other are formed on a surface facing a surface opposite to the display surface of the display device 30, and guide light from the light source 21 toward the display surface of the display device 30.

In order for the light conductive plate 22 to guide (reflect) the light from the light source 21 toward the display surface of the display device 30, a relation of n1>n2 must be satisfied, where n1 denotes the refractive index of the light conductive plate 22 (refractive index relating to light), and n2 denotes the refractive index of a medium in contact with the surface (a prism array forming surface) of the light conductive plate 22 opposite to the display surface side of the display device 30.

The light conductive plate 22 is formed of, for example, a transparent acrylic resin, and n1 is about 1.5. The above-described medium in the present invention is the air similar to that in a conventional technology shown in FIG. 2, and n2 is equal to 1, thereby satisfying a relation n1>n2.

Thus, light from the light source 21 travels in the light conductive plate 22, and is reflected at the surface of the array of prisms toward the display surface of the display device 30 to be shed thereon. The light entering the display device through its display surface is reflected at the display surface, travels through the light conductive plate, an air layer present between the light conductive plate and the PET film, and the touch panel 10, then exits out the touch panel (refer to an arrow indicated by a broken line in the figure), and thereby the display image of the display surface can be visualized.

Various kinds of coating are implemented on the PET film 16a as necessary, and the characteristic thereof can be improved. For example, the hard-coating is implemented on the PET film 16a to provide a specified hardness so that the surface of the PET film is not damaged.

Figure 2:
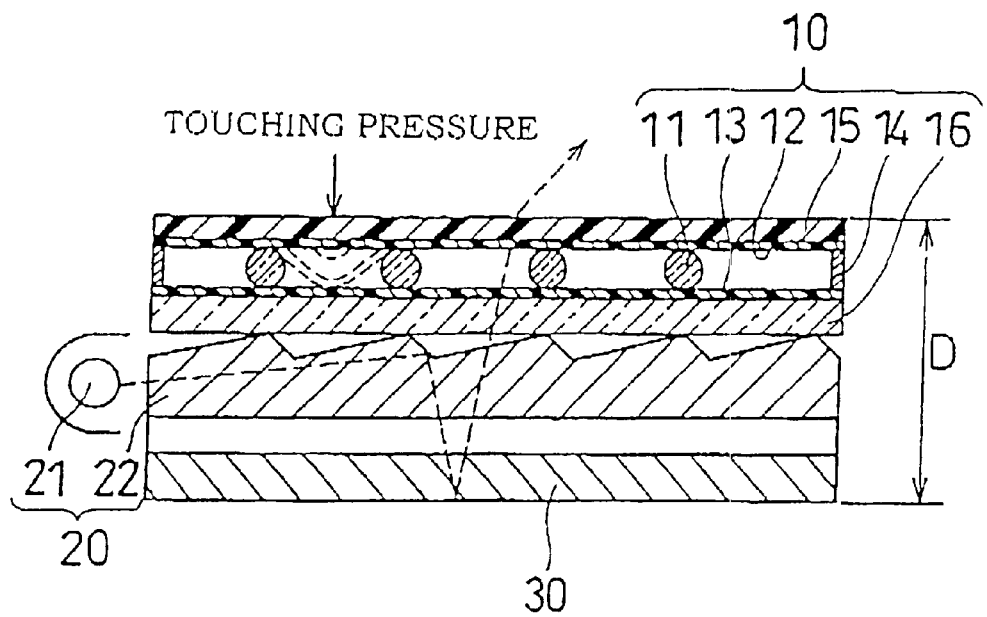
FIG. 2 is a sectional view of a conventional touch panel for a display device.
Figure 3:
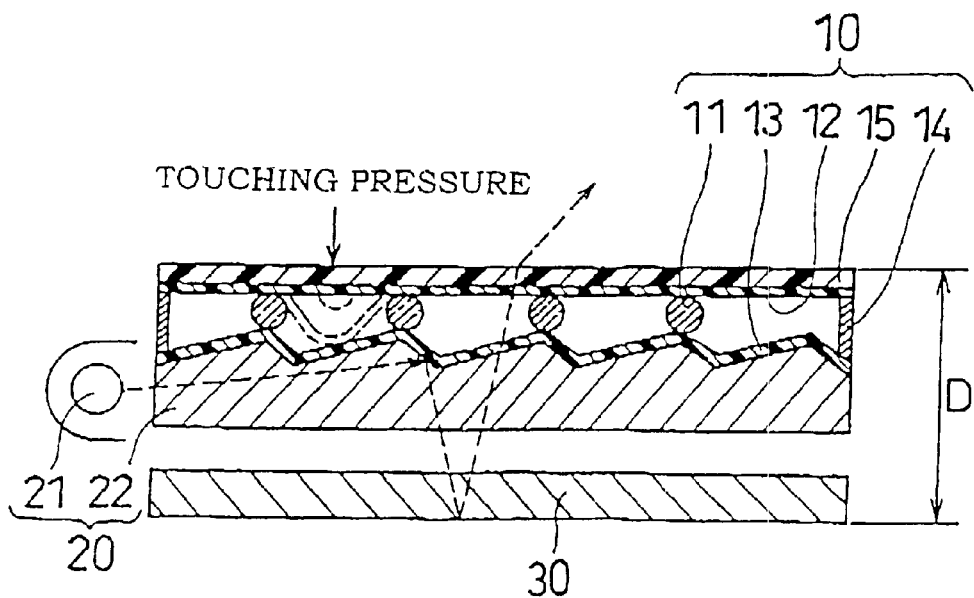
FIG. 3 is a sectional view of the conventional touch panel for the display device with a second resistive layer closely attached to a surface of a light conductive plate of a front light unit.

Since, as described above, the present invention basically has the similar construction to that of a conventional technology shown in FIG. 2, where one resistive layer of a pair of resistive layers disposed facing each other across insulating dot spacers is laminated on a translucent flat plate, the advantages by the same constitution are available, and at the same time the problems of the conventional technology shown in FIG. 3 can be solved.

This means that since the one resistive layer which is pressed by way of the insulating dot spacer is supportedly laid on the translucent flat plate (the PET film), the linearity of the resistance value at each position on the touch panel operation surface is well ensured, and the accuracy of information obtained on the position is not degraded.

Further, each of the insulating dot spacers to constitute the touch panel can be disposed on the one resistive layer to a uniform height in an extremely easy manner, and thus the transparent film (such as PET film) laminated on the other resistive layer and constituting the touch panel operation surface does not become wavy and the display quality is not degraded.

In addition, the insulating dot spacers are pressed against a flat inner surface of the one resistive layer laid on the translucent flat plate, and thus the one resistive layer is not damaged, thereby providing an excellent durability.

Since, in the present invention, the light conductive plate of the front light unit is attached to the outer surface of the PET film which is the translucent flat plate in an integrated manner, the strength of the touch panel as a single unit against a vibration or shock in conveyance in a conventional technology (refer to FIG. 2) is no longer required. The PET film itself is flexible and excellent in vibration resistance and shock resistance, and various kinds of coating are available.

The thickness of the PET film which is the translucent flat plate can be reduced to one quarter to one half of a conventional thickness (of glass plate) of approximately 0.4 mm. The whole thickness (the depth) D can be reduced when the touch panel and the front light unit in accordance with the present invention are attached to the display device, and the problems in the conventional technology shown in FIG. 2 can be solved. The PET film is not damaged by the light conductive plate.

In addition, the light conductive plate is not so hard as the glass plate, and PET is lighter than glass, and thus, when the vibration or the shock is applied to the touch panel, the light conductive plate is neither damaged nor broken by the glass plate, different from the conventional technologies.

What is claimed is:

1. A touch panel for a display device, which is structured such that one resistive layer of a pair of resistive layers disposed facing each other across a plurality of insulating dot spacers is laid on a translucent flat plate, is disposed close to a display device such that said translucent flat plate is directed toward a display surface of said display device and that a front light unit comprising a light source and a light conductive plate to guide light emitted from said light source toward said display surface of said display device is interposed therebetween, and in which a signal is generated by touching an outer surface of the other resistive layer corresponding to a position touched, wherein said translucent flat plate is formed of a polyethylene terephthalate film, and said light conductive plate is integrally combined with an outer surface of said polyethylene terephthalate film.

2. Touch panel for a display device according to claim 1, wherein said polyethylene terephthalate film has a thickness ranging from 0.1 to 0.2 mm.

3. Touch panel for a display device according to claim 1, wherein said polyethylene terephthalate film is provided with coating.

4. A touch panel for a display device, which is structured such that one resistive layer of a pair of resistive layers disposed facing each other across a plurality of insulating dot spacers is laid on a translucent flat plate, is disposed close to a display device such that said translucent flat plate is directed toward a display surface of said display device and that a front light unit comprising a light source and a light conductive plate to guide light emitted from said light source toward said display surface of said display device is interposed therebetween, and in which a signal is generated by touching an outer surface of the other resistive layer corresponding to a position touched, wherein said translucent flat plate is formed of a polyethylene terephthalate film, and said light conductive plate is integrally combined with an outer surface side of said polyethylene terephthalate film, said polyethylene terephthalate film being coupled to said light conductive plate on peripheral portions of said light conductive plate.

* * * * *